United States Patent [19]

Terajima

[11] Patent Number: 5,550,651
[45] Date of Patent: Aug. 27, 1996

[54] IMAGE READING APPARATUS HAVING A PLURALITY OF IMAGE SENSORS FOR READING A PORTION OF AN IMAGE A PLURALITY OF TIMES

[75] Inventor: Hisao Terajima, Yokohama, Japan

[73] Assignee: Canon Kabushiki Kaisha, Tokyo, Japan

[21] Appl. No.: 402,979

[22] Filed: Mar. 13, 1995

Related U.S. Application Data

[63] Continuation of Ser. No. 40,438, Apr. 1, 1993, abandoned.

[30] Foreign Application Priority Data

Apr. 3, 1992 [JP] Japan .................................. 4-082189

[51] Int. Cl.⁶ .............................. H04N 1/04; H01L 27/00
[52] U.S. Cl. ........................ 358/496; 358/474; 358/486; 358/483; 250/208.1
[58] Field of Search ........................ 358/496, 474, 358/448, 497, 486, 494, 471, 409, 496, 482, 483; 250/208.1; 257/231, 234; 382/323; 348/218

[56] References Cited

U.S. PATENT DOCUMENTS

| | | | |
|---|---|---|---|
| 4,691,114 | 9/1987 | Hasegawa et al. | 358/474 |
| 4,692,812 | 9/1987 | Hirahara et al. | 358/285 |
| 4,734,787 | 3/1988 | Hayashi | 358/409 |
| 4,899,226 | 2/1990 | Tanimoto et al. | 358/451 |
| 4,953,014 | 8/1990 | Takaragi | 358/451 |
| 4,985,760 | 1/1991 | Maeshima et al. | 358/517 |
| 5,079,624 | 1/1992 | Sasusa et al. | 358/75 |

*Primary Examiner*—Edward L. Coles, Sr.
*Assistant Examiner*—Allan A. Esposo
*Attorney, Agent, or Firm*—Fitzpatrick, Cella, Harper & Scinto

[57] ABSTRACT

Two line sensors for reading an original are arranged parallel to each other and are moved in a subscanning direction to read an original image. The leading line sensor reads one line on the original, and an output from the leading line sensor is held in analog memories. One line on the original is then read by the trailing line sensor, and an output from the trailing line sensor is added to the output, from the leading line sensor, held in the analog memories, thereby obtaining an effect equivalent to doubled charge storage time in reading one line on the original. A desired resolution can be selected in accordance with the sizes of two sensor elements, the layout of the sensors, and the output timings of the analog memories.

5 Claims, 6 Drawing Sheets

IMAGE READING APPARATUS HAVING A PLURALITY OF IMAGE SENSORS FOR READING A PORTION OF AN IMAGE A PLURALITY OF TIMES

This is a continuation of application Ser. No. 08/040,438, filed Apr. 1, 1993, now abandoned.

BACKGROUND OF THE INVENTION

1. Field of the Invention

The present invention relates to an image reading apparatus using a lineimage sensor in a facsimile apparatus or the like.

2. Related Background Art

A conventional apparatus of this type uses a CCD type line image sensor. Main scanning of a read original is performed by this sensor, and subscanning is performed by relatively moving the sensor and the original in a direction perpendicular to the line direction of the sensor.

The above sensor has the following structure.

The sensor comprises photodiodes arranged in an array, storage electrodes, arranged in a one-to-one correspondence with the photodiodes, for storing charges generated by electromotive forces of the photodiodes, and a charge transfer element (CCD) for receiving the charges stored in the storage electrodes and sequentially shifting the charges, thereby outputting the charges.

In a conventional read apparatus, a read operation must be completed within a short storage time so as to read the original at high speed. For this purpose, a bright light source such as a fluorescent lamp is required.

An inverter is required to keep the fluorescent lamp on with an RF power. The fluorescent lamp may become an unnecessary radiation source, a large amount of heat is generated to result in a short service life, and the resultant apparatus is bulky and has a high cost.

When an LED array is used as a light source, the above problem is solved, but the amount of light generated by the LED array is small. It is therefore difficult to read an original at high speed.

When the CCD sensitivity (S/N ratio) is increased, a high-speed read operation can be realized even with an LED array light source.

The CCD sensitivity (S/N ratio) is almost proportional to the area of the photodiode opening surface per pixel. When the magnifications in the main scanning and subscanning directions are increased at the same rate so as to increase the total sensitivity, the CCD chip size is increased at the same rate as the magnification of pixels in the main scanning direction (longitudinal direction), resulting in high cost.

When the magnification of pixels is increased in only the subscanning direction, the sensitivity is increased while requiring almost no increase in CCD chip size. In this case, however, the resolution in the subscanning direction is undesirably decreased.

SUMMARY OF THE INVENTION

The present invention has been made in consideration of the above problems, and has as its object to improve an image reading apparatus.

It is another object of the present invention to obtain the same effect-as in an increase in storage time per line without decreasing the read throughput in such a manner that two reading means (two line sensors) are arranged, a given line is read by the first reading means (first line sensor), a means for storing an output from the first sensor is arranged, and the output from the first line read by the first sensor is read out from the storage means and is added to an output from the second sensor when the given line is to be read and output by the second sensor.

It is still another object of the present invention to provide an image reading apparatus wherein the CCD chip size is slightly increased in a subscanning direction to obtain the same effect as in doubling the CCD sensitivity (S/N ratio), and an LED light source is used to perform a high-speed read operation.

It is still another object of the present invention to provide a reading apparatus wherein a storage means for storing an n-line output when a maximum resolution in a subscanning direction is n times a minimum resolution in the subscanning direction is arranged to select a desired resolution from a plurality of resolutions in the subscanning direction.

The above and other objects, features, and advantages of the present invention will be apparent from the following detailed description of preferred embodiments in conjunction with the accompanying drawings.

DETAILED DESCRIPTION OF THE PREFERRED EMBODIMENTS

The present invention will be described in detail with reference to an embodiment illustrated in the accompanying drawings.

Figure 1:
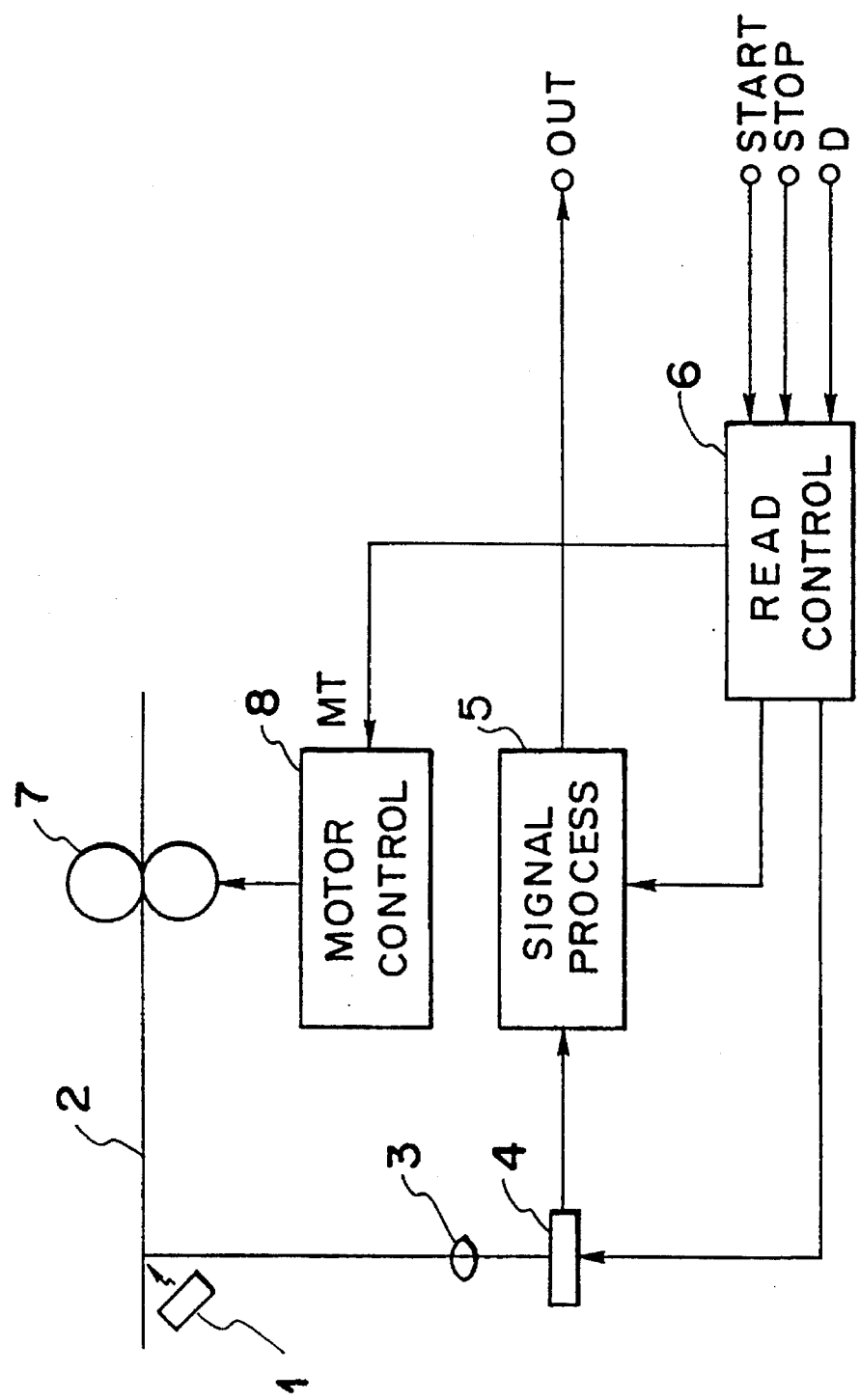
FIG. 1 is a view showing an arrangement of an embodiment of the present invention.

FIG. 1 shows an arrangement of a facsimile apparatus to which the present invention is applied.

Referring to FIG. 1, an image of an original 2 illuminated with an LED light source 1 is reduced by a lens 3, and the reduced image is projected on an image sensor 4, thereby inputting the image.

An output from the image sensor 4 is input to a signal process unit 5, and binary data is output from the signal process unit 5.

A read control unit 6 outputs various timing pulses to the image sensor 4, the signal process unit 5, and a motor control unit 8. A START signal for instructing the start of read operation and a STOP signal for instructing the end of read operation are input to the read control unit 6. A signal D for designating a resolution in a subscanning direction is also input to the read control unit 6. In this embodiment, the resolution in the subscanning direction can be selected from three resolutions.

The timing signals output from the read control unit 6 to the image sensor 4 are G, CK, $\overline{CK}$, φ1, φ2, and the like (to be described later).

An original feed unit 7 for feeding the original 2 in units of lines includes a convey roller, a stepping motor, and a stepping motor driver.

When the motor control unit 8 receives a motor drive trigger signal MT from the read control unit 6, the motor control unit 8 changes an excitation phase of the stepping motor and drives the stepping motor to feed the original 2 by 1/15.4 mm.

Figure 2:
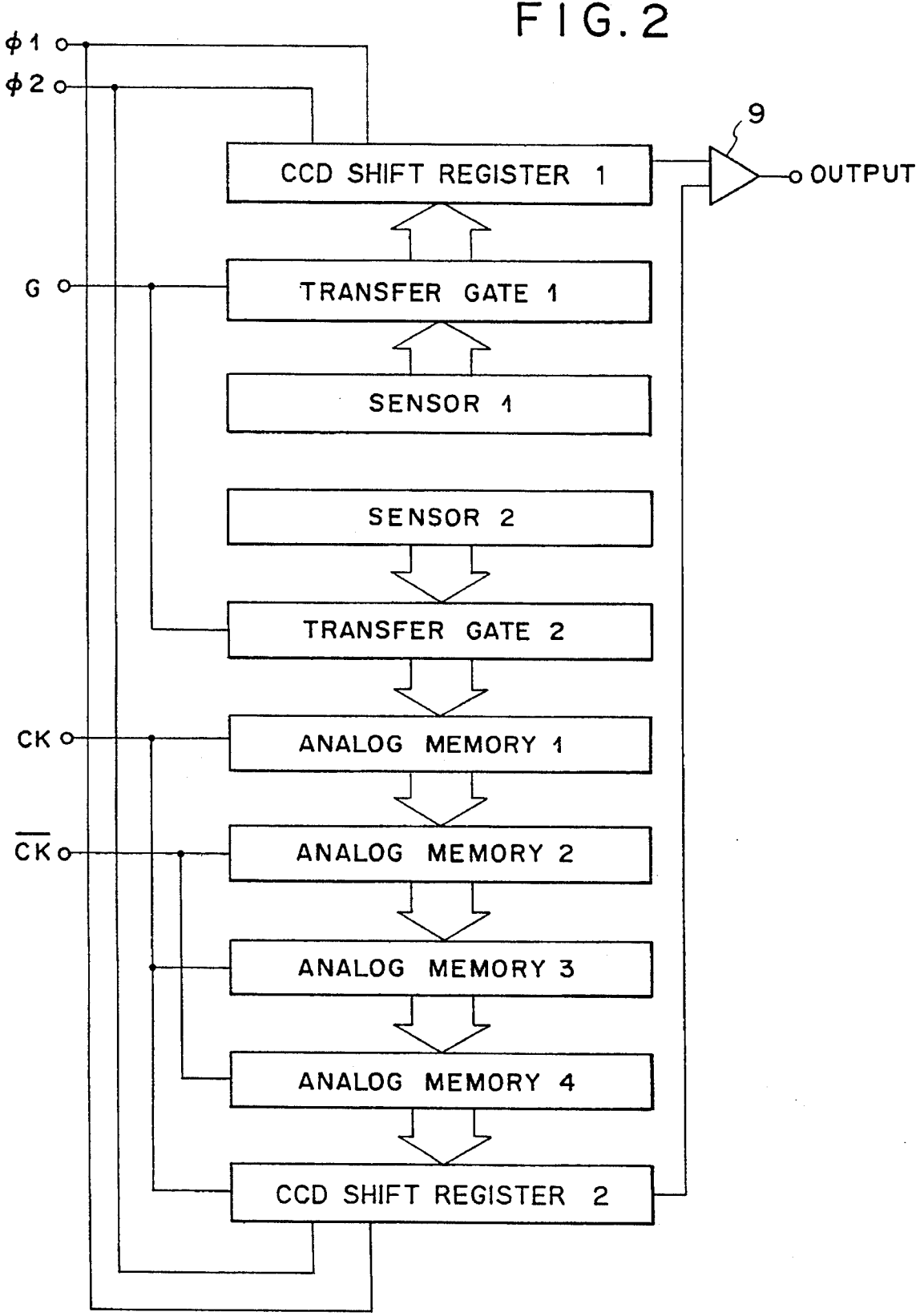
FIG. 2 is a diagram showing an arrangement of an image sensor of the embodiment.

FIG. 2 is a view showing an arrangement of a CCD image sensor of the present invention.

In this embodiment, the resolution in the main scanning direction is 8 pixels/m, and the resolution in the subscanning direction can be selected from resolutions of 3.85 pixels/m, 7.7 pixels/m, and 15.4 pixels/mm.

Since the maximum resolution (15.4 pixels/m) is four times the minimum resolution (3.85 pixels/m), an analog memory for storing a 4-line sensor output is arranged.

The apparatus of this embodiment has two sensors (each consisting of a photodiode array and electrodes for storing charges) and two CCD shift registers.

A transfer gate 1 for transferring an output from a sensor 1 to a CCD shift register 1 and a transfer gate 2 for transferring an output from a sensor 2 to an analog memory 1 are controlled by the same signal G.

The signal CK or the signal $\overline{CK}$ having a phase opposite to that of the signal CK is supplied to analog memories 1, 2, 3, and 4, and the CCD shift register 2. The signals CK and $\overline{CK}$ are simultaneously changed in opposite phases to sequentially transfer the output signal, from the sensor 2, stored in the analog memory 1 in an order of the analog memory 2, the analog memory 3, the analog memory 4, and the CCD shift register 2.

A shift clock φ1 and a shift clock φ2 having a phase opposite to that of the shift clock φ1 are supplied to the CCD shift register 1 and the CCD shift register 2. When the shift clocks φ1 and φ2 are simultaneously changed in opposite phases, the data in the CCD shift registers 1 and 2 are shifted and output.

Outputs from the CCD shift registers 1 and 2 are input to an adder 9, and a sum signal is output from the adder 9.

Figure 3:
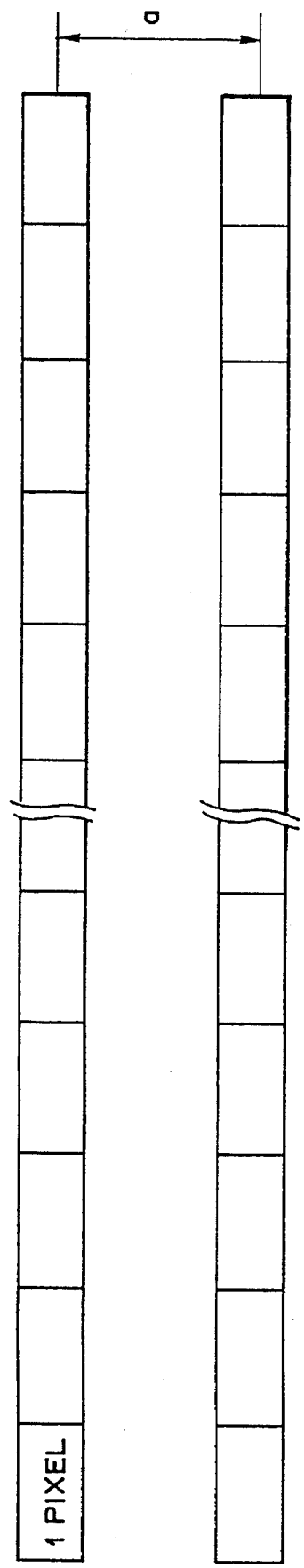
FIG. 3 is a view showing the opening layout of the image sensor of the embodiment.

FIG. 3 is a view showing the layout of a light input portion of the sensor of the present invention.

In this embodiment, the original image is reduced to 0.112 times, and the reduced original image is projected on the CCD image sensor. As one pixel has a size of 1/8 mm*1/15.4 mm, the opening area of the photodiode per pixel is 14 μm*7.3 μm.

Since the minimum resolution in the subscanning direction is 3.85 pixels/mm, the pitch of the photodiodes constituting the array is defined as follows:

$$a = (1/3.85) * 0.112 = 29.1 \text{ μm}$$

An operation of the reading apparatus of this embodiment will be described below.

Figure 4:
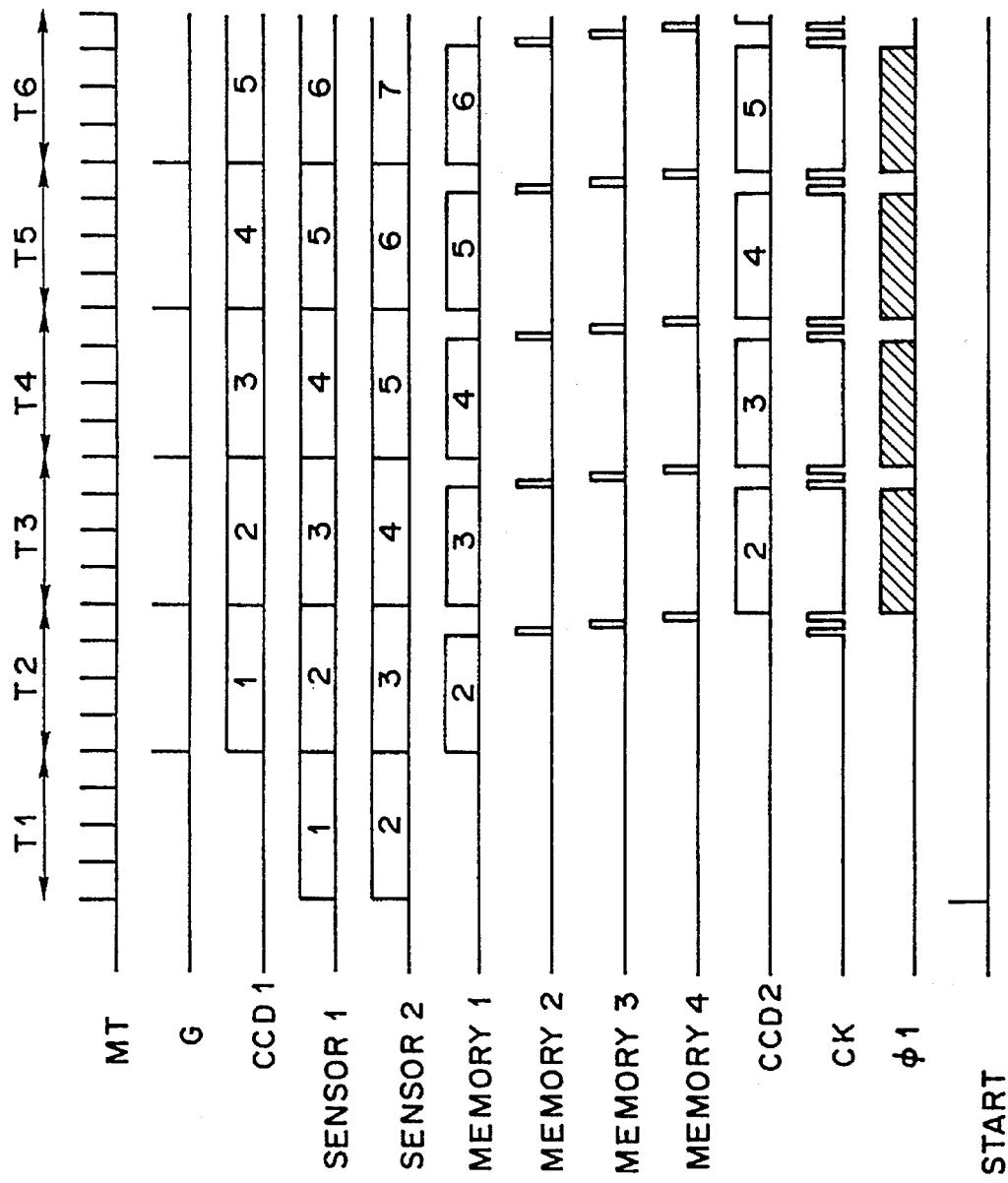
FIG. 4 is a timing chart showing a read operation of the embodiment.
Figure 5:
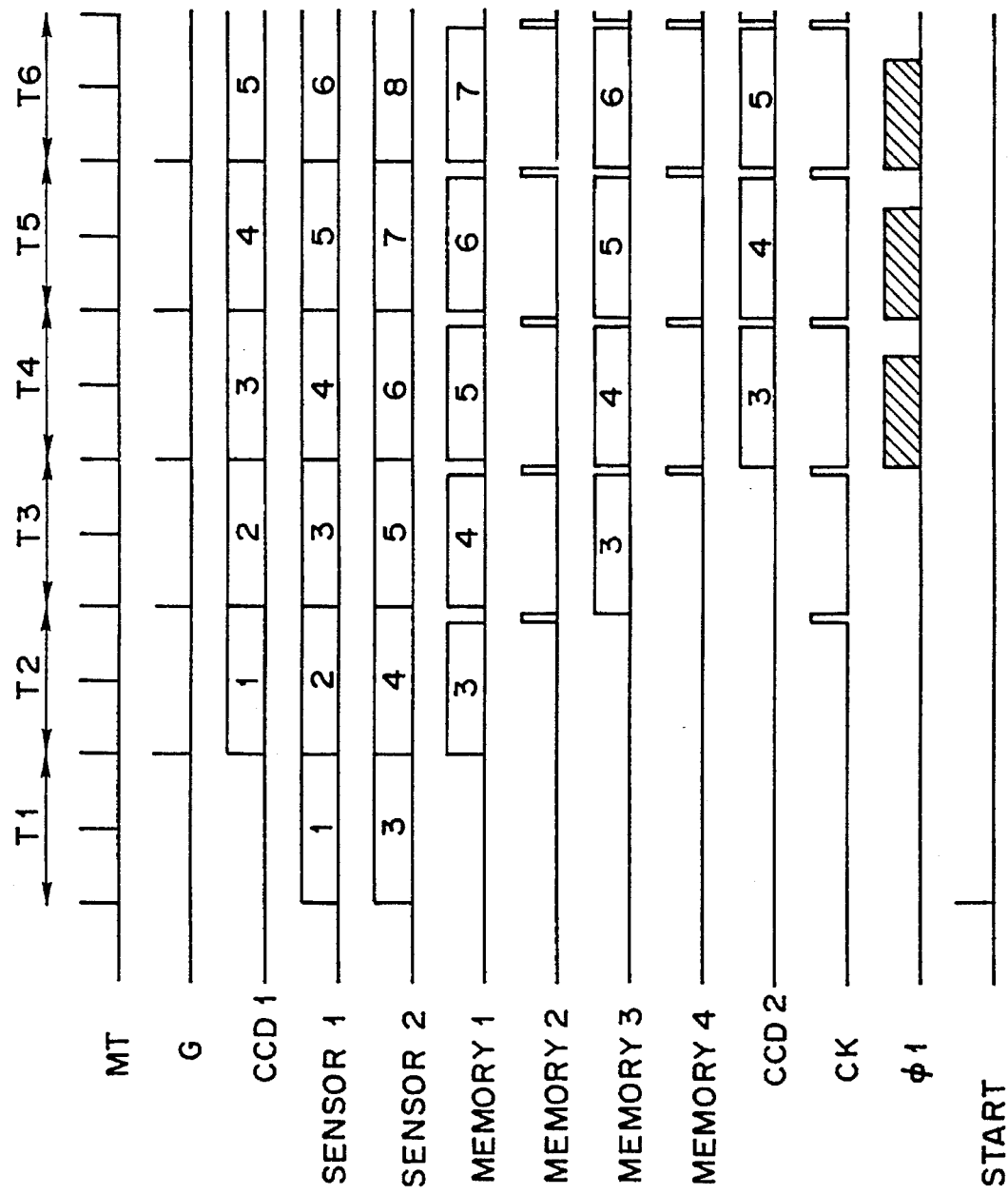
FIG. 5 is a timing chart showing another read operation of the embodiment.
Figure 6:
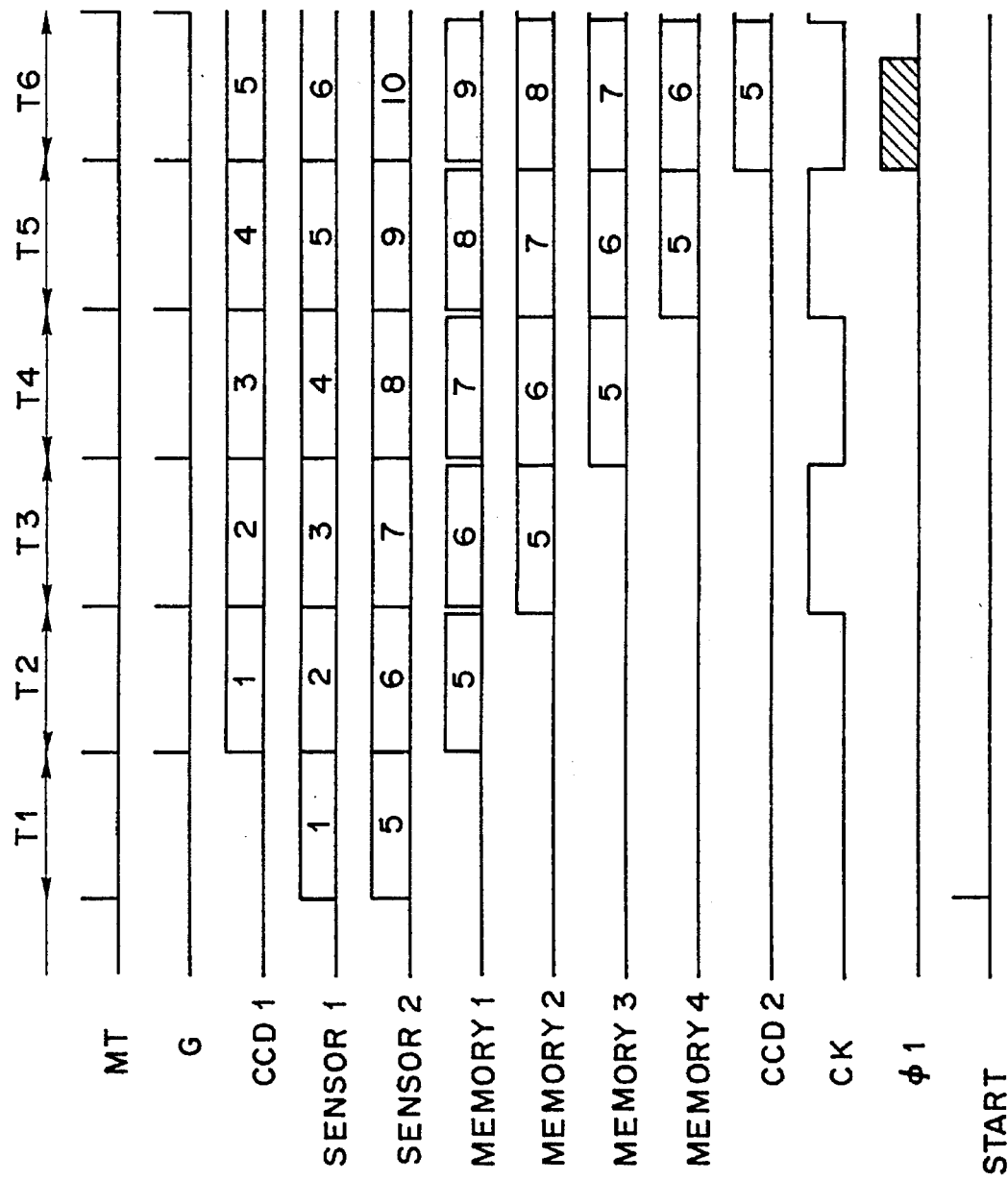
FIG. 6 is a timing chart showing still another read operation of the embodiment.

FIGS. 4, 5, and 6 are timing charts showing sensor operations, respectively.

T1, T2, and the like in FIGS. 4, 5, and 6 are read operation cycles and have equal intervals.

The charts of the sensors 1 and 2 represent times during which photoelectric conversion outputs from the sensors are stored, and numbers in the charts represent lines. For example, the sensor 1 stores data of the first line, the second line, the third line, the fourth line, . . . in the order named.

The charts of the memories 1 to 4 represent times during which analog image data stored in the sensor 2 are kept stored in the analog memories.

The charts of the CCD 1 and the CCD 2 represent times during which the CCD shift registers keep storing the analog image data. More accurately, hatched portions on the chart of φ1 represent times during which the shift clocks φ1 and φ2 are input. During these times, the CCD shift registers externally output the stored analog image data.

The chart of CK represents timings for inverting the signal CK. At these timings, the analog image data stored in the sensor 2 is shifted in an order of the analog memory 1, the analog memory 2, the analog memory 3, and the analog memory 4. Although not shown, the chart of the signal $\overline{CK}$ is an inverted signal of the signal CK.

G, CK, $\overline{CK}$, φ1, φ2, and MT described above are generated by the read control unit 6 and are output to the image sensor 4.

FIG. 4 is a timing chart of a read operation when the resolution in the subscanning direction is designated to be 1/3.85 mm in accordance with the signal D.

The sensor 1 and the sensor 2 are located to simultaneously read lines spaced apart from each other by 1/3.85 mm. For this reason, while the sensor 1 reads the first line, the sensor 2 reads the second line adjacent to the first line.

When the START signal is input, the first storage operation is started.

When the signal G is input at the end of the read cycle T1, analog image data stored during the read cycle T1 are transferred from the sensor 1 to the CCD shift register 1 and from the sensor 2 to the CCD shift register 2, respectively. In the subsequent storage operation, the CCD shift register 1 receives and outputs read data delayed by one cycle.

During the read cycle T1, the signal MT is generated four times to move the original by 1/15.4 mm*4, i.e., 1/3.85 mm. The sensor 1 reads and stores an image while the original is moved by one line in the subscanning direction. This read method is called "moving read". Although this method has a slightly lower subscanning resolution than that of an operation for independently performing original movement and original read operation, the above method can perform a high-speed read operation and is thus popular.

During the read cycle T2, the signals CK and $\overline{CK}$ are changed four times to transfer the data from the analog memory 1 to the CCD shift register 2.

During the read cycle T3, the shift clocks φ1 and φ2 are input to simultaneously output the data of the line 2 from the two shift registers because the read data of the line 2 is held in both the CCD shift registers 1 and 2.

From the read cycle T3, data of a new line is output from the two outputs every cycle.

When these two outputs are added to each other, a sensitivity (S/N ratio) equivalent to a doubled storage time can be obtained without changing the read time of one line.

FIG. 5 is a timing chart of a read operation when the resolution in the subscanning direction is set to be 1/7.7 mm.

During one cycle, the signal MT is generated twice to move the original by 1/15.4 mm*2, i.e., 1/7.7 mm.

The sensor 1 and the sensor 2 are located to simultaneously read lines spaced apart from each other by 1/3.85 mm. For this reason, while the sensor 1 reads the first line, the sensor 2 reads the third line.

From the read cycle T2, the signals CK and $\overline{CK}$ are changed twice in the second half of each cycle. The data in the analog memory 1 is transferred to the analog memory 3, and the data in the analog memory 3 is transferred to the CCD shift register 2.

During the read cycle T4, the shift clocks φ1 and φ2 are input to simultaneously output the data of the line 3 from the two shift registers because the read data of the line 3 is held in both the CCD shift registers 1 and 2.

From the read cycle T4, data of a new line is obtained from two outputs every cycle.

FIG. 6 is a timing chart showing a read operation when the resolution in the subscanning direction is set to be 1/15.4 mm.

The signal MT is generated once during one cycle to move the original by 1/15.4 mm.

The sensor 1 and the sensor 2 are located to simultaneously read lines spaced apart from each other by 1/3.85 mm. For that reason, while the sensor 1 reads the first line, the sensor 2 reads the fifth line.

From the read cycle T2, the signals CK and $\overline{CK}$ are changed once in the second half of each cycle. The data in each analog memory is sequentially shifted in an order of the analog memories 1, 2, 3, and 4, and the CCD shift register 2.

During the read cycle T6, the shift clocks φ1 and φ2 are input to simultaneously output the data of the line 5 from the two shift registers because the read data of the line 5 is held in both the CCD shift registers 1 and 2.

From the read cycle T6, data of a new line is obtained from two outputs every cycle.

(Another Embodiment)

In the above embodiment, two line sensors are used. However, a larger number of sensors can be used.

For example, when three sensors are used, the third sensor is spaced apart from the second sensor by 29.1 μm, and an 8-line analog memory is added. The third sensor reads data of a line which is ahead of that of the second sensor by one line. The three sensors may read the same line on the original at different timings, and outputs can be simultaneously extracted therefrom.

When four sensors are used, a 12-line memory is added.

When the above arrangement is generalized, the number of analog memories required when the maximum resolution in the subscanning direction is N times the minimum resolution in the subscanning direction and the M line sensor are arranged is defined as follows:

$$N \sum_{i=1}^{M-1} i$$

This embodiment exemplifies a reduction projection read apparatus. However, the present invention is equally applicable to a contact image sensor which is brought into tight contact with an original.

The present invention is not limited to the particular embodiments described above. Various changes and modifications may be made.

What is claimed is:

1. An image reading apparatus comprising:

a plurality of linear image sensors for reading an original, each image sensor having a plurality of pixels and being arranged parallel to each other to read portions of the original, at least one of the portions being at a predetermined distance from other portions, each of said image sensors reading portions of the original corresponding to the plurality of pixels and outputting pixel image signals;

setting means for setting a resolution to read the original;

means for relatively moving the original and said image sensors at a speed selected according to the resolution set by said setting means;

delay means for delaying pixel image signals from a first one of said image sensors in accordance with the set resolution so as to obtain pixel image signals relating to pixel image signals corresponding to a line of the original read by a second one of said image sensors; and adding means for adding (1) the pixel image signals obtained by said delay means and (2) the pixel image signals from the second image sensor, the added pixel image signals each relating to a same line of the original.

2. An apparatus according to claim 1, wherein said delay means is a memory.

3. An apparatus according to claim 2, wherein said memory is an analog memory and said adding means adds an analog image signal from said delay means and an analog image signal from the second of said image sensors.

4. An image processing apparatus according to claim 1, further comprising a driver for driving said plurality of linear image sensors with substantially the same timing.

5. An image processing apparatus according to claim 4, wherein said driver drives said sensors with a common driving signal.

* * * * *

UNITED STATES PATENT AND TRADEMARK OFFICE
CERTIFICATE OF CORRECTION

PATENT NO. : 5,550,651

DATED : August 27, 1996

INVENTOR : HISAO TERAJIMA

It is certified that error appears in the above-identified patent and that said Letters Patent is hereby corrected as shown below:

<u>ON THE TITLE PAGE</u>

In [56] References Cited, under U.S. PATENT DOCUMENTS:

"Sasusa et al." should read --Sasuga et al.--.

<u>COLUMN 1</u>

Line 13, "lineimage" should read --line image--;
Line 66, "effect-as" should read --effect as--.

<u>COLUMN 4</u>

Line 46, "times-to" should read --times to--.

UNITED STATES PATENT AND TRADEMARK OFFICE
CERTIFICATE OF CORRECTION

PATENT NO. : 5,550,651

DATED : August 27, 1996

INVENTOR : HISAO TERAJIMA

It is certified that error appears in the above-identified patent and that said Letters Patent is hereby corrected as shown below:

<u>COLUMN 6</u>

Line 40, "processing" should read --reading--;
Line 43, "processing" should read --reading--.

Signed and Sealed this

Fourteenth Day of January, 1997

Attest:

BRUCE LEHMAN

Attesting Officer

Commissioner of Patents and Trademarks